United States Patent [19]
Porter

[11] Patent Number: 5,423,004
[45] Date of Patent: Jun. 6, 1995

[54] COMPUTER WITH ELECTRICALLY ISOLATED PRINTER PORT USING SHUNT TRANSISTORS CONTROLLED BY A COMMON CHARGE-ROBBING NODE

[75] Inventor: Jeffrey W. Porter, Austin, Tex.
[73] Assignee: Dell USA, L.P., Austin, Tex.
[21] Appl. No.: 743,657
[22] Filed: Aug. 12, 1991
[51] Int. Cl.⁶ ............................. G06F 3/14; G06F 3/00
[52] U.S. Cl. ........................... 395/275; 364/DIG. 2; 364/927.92; 364/927.95
[58] Field of Search ................... 395/250, 325, 275; 375/121

[56] References Cited

U.S. PATENT DOCUMENTS

| | | | |
|---|---|---|---|
| 4,291,266 | 9/1981 | Portmann | 320/2 |
| 4,603,320 | 7/1986 | Farago | 340/347 DD |
| 4,607,379 | 8/1986 | Marshall, Jr. et al. | 375/121 |
| 4,631,698 | 12/1986 | Walsh et al. | 395/325 |
| 5,210,846 | 5/1993 | Lee | 395/425 |

*Primary Examiner*—Thomas C. Lee
*Assistant Examiner*—D. Dinh
*Attorney, Agent, or Firm*—Bob Groover; Jim Huffman; Jeff Hood

[57] ABSTRACT

A parallel port adapter, which provides a special buffering circuit on the four control lines from the system to the printer. This circuit provides a low-impedance bidirectional path for communication between the CPU and the printer, whenever any of the control lines is active. The circuit uses blocking diodes on all four lines, and uses pass transistors in parallel with the blocking diodes, and uses power-robbing to turn on the pass transistors whenever the port is in use.

18 Claims, 3 Drawing Sheets

COMPUTER WITH ELECTRICALLY ISOLATED PRINTER PORT USING SHUNT TRANSISTORS CONTROLLED BY A COMMON CHARGE-ROBBING NODE

PARTIAL WAIVER OF COPYRIGHT

All of the material in this patent application is subject to copyright protection under the copyright laws of the United States and of other countries. As of the first effective filing date of the present application, this material is protected as unpublished material.

Portions of the material in the specification and drawings of this patent application are also subject to protection under the maskwork registration laws of the United States and of other countries.

However, permission to copy this material is hereby granted to the extent that the owner of the copyright and maskwork rights has no objection to the facsimile reproduction by anyone of the patent document or patent disclosure, as it appears in the United States Patent and Trademark Office patent file or records, but otherwise reserves all copyright and maskwork rights whatsoever.

BACKGROUND AND SUMMARY OF THE INVENTION

The present invention relates to small computer systems.

The Standard "Parallel Port"

Part of the industry-standard architecture (ISA),[1] which dates back to at least ten years ago, is a definition for a "parallel port" (port "LPT1") which derives from older Cemronics printer standards. The line assignments in this port (detailed below) are not highly parallelized, but do provide a moderately fast rate of data transfer (about 19,200 kbps). The pinout of this port, in the standard DB-25 connector, is shown in FIG. 3. See generally Dowden, INSIDE THE EISA COMPUTER (1990), which is hereby incorporated by reference.

[1] See generally, e.g., P. Norton, THE PETER NORTON PROGRAMMER'S GUIDE TO THE IBM PC (1985), which is hereby incorporated by reference.

This port definition is highly standardized, and a parallel port of this type appears on nearly every "ISA" or "EISA" (extended industry-standard architecture) or PS/2 machine, and also on other machines.

In the original IBM PC (a leading prototype of the ISA), the primer port was controlled by LSTTL MSI chips. In more recent machines, this function of port control is typically combined with other functions in a more highly integrated support chip on the computer motherboard.

Observed Problems with the Parallel Port

Many personal computers have experienced problems when a parallel printer is connected to the system. These problems include:

1) The system board fails to cold boot when a printer is connected to the parallel port and turned on.
2) The printer will continuously advance paper if left on after the system is turned off.
3) The printer cannot be taken on or off-line when the computer is turned off.
4) The parallel port and sometimes the serial ports will fail when a primer destroys the I/O chip. The parallel port isolating buffer described resolves these problems by greatly reducing the effects that a parallel device can have on a computer system that is turned off.

As taught by the present application, many of these problem occurrences result from the use of CMOS-technology port interface circuitry, wherein a PMOS pass transistor permits high signal voltages to be passed without incurring a $V_T$ drop.[2] However, this PMOS device provides a low impedance path to the printer when the system board is powered off. This low impedance can cause all of the above problems, depending on the particular system board, printer, and other devices installed in the system.

[2] For example, if a normal (enhancement-mode) NMOS pass transistor is used as a pass gate to transmit high levels, the drain voltage can only be pulled up to within about one threshold voltage ($V_T$) of the voltage applied to the gate. This limitation is referred to as "$V_T$ drop." The magnitude of a threshold voltage depends on the particular integrated circuit process parameters used, but is typically in the neighborhood of a volt in modern CMOS processes.
Conversely, a PMOS pass transistor (but not an NMOS transistor) will incur a $V_T$ drop when transmitting low logic levels. Thus, by using NMOS and PMOS transistors back-to-back, and controlling them with opposite logic signals, VT drops can be completely avoided. This configuration is known as a "transmission gate." Use of transmission gates does not avoid the problems noted above, since the PMOS transistor in a transmission gate will be ON whenever the gate voltage drifts down to ground after power is removed.

For example, this problem has been observed in systems using the 16C452 (dual asynchronous communications element) chip, and in systems using the VTI 82C106 chip, and is believed to occur in other systems as well.

Electrical Isolation for the Parallel Port

The invention described solves these problems by isolating four control lines in the standard printer port interface, by preventing the low impedance path seen when the system board is powered off.

Disclosed is a parallel port isolation buffer which, when connected in series with the parallel port, will generally prevent the above problems from occurring. Through the use of eight diodes, four transistors, and four resistors, this buffer isolates the printer control signals from the effects of turning off a computer system.

On each of the buffered lines, a blocking diode permits the computer to pull up the line to the primer. This blocking diode is shunted by a bipolar transistor (NPN, in the presently preferred embodiment). Base current for this bipolar is stolen, through isolation diodes, from whichever of the four buffered lines is high.

The functional definition of the port requires that, during normal operation, one of the control lines will always be high. Thus, during normal operation, there will always be a base current source to turn on the NPNs in the other three buffered lines. Thus, these NPNs provide a low-impedance bidirectional path for handshaking between the computer and the printer.

In the presently preferred embodiment, only four control lines are isolated. This preferred arrangement takes advantage of the peculiarities of the standard port definition (as discussed below) and limits manufacturing cost, while still solving the problems noted above. However, in alternative embodiments, other lines can also be similarly isolated.

Compact Parallel Port Adapter

In the presently preferred embodiment, this buffer is packaged in a male/female printer port adapter, which is connected between the printer cable and the printer port connector on the computer chassis. This adapter has the particular advantage that it can be sold or given to users who, for whatever reason, experience power-off parallel port problems.

However, in an alternative class of embodiments, equivalent circuitry can be integrated onto the system motherboard.

BRIEF DESCRIPTION OF THE DRAWING

The present invention will be described with reference to the accompanying drawings, which show important sample embodiments of the invention and which are incorporated in the specification hereof by reference, wherein.

DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.
Detailed Sample Embodiment Any buffer that requires an external power source would be more expensive and less convenient for the customer to use.

Note that some systems are less susceptible to the problems noted above, and thus may not need the innovative electrical port interposition described herein. For example, the parallel printer buffers which perform print spooling (storing data for later printing) might solve some of the problems, but are relatively expensive and inconvenient for the customer. However, for those systems which suffer any of the problems described above, the disclosed innovations can provide an advantageous solution.

This isolating buffer is a small device that attaches directly to the parallel printer connector at the back of the personal computer. The printer cable would then plug into the buffer. When the computer system is turned on, the buffer will be in a pass-thru mode and have virtually no effect on the signals going to and from the printer. When the computer is turned off, the buffer will open the connection on the signal lines between the computer and printer, preventing all of the reported problems that occur with the system off and the printer on. The circuitry of the isolating buffer, in the presently preferred embodiment, is shown schematically in FIG. 1.

There are four parallel printer port control signals, STROBE\, SELECT\, AUTOFEED\, and INIT\, that go from the computer to the printer. Most of the problems seen are the result of one or more of these control signals being sensed low when the computer is turned off. For example, when the STROBE\ control signal to the printer is held low, some printers will continuously advance paper. Other times the SELECT\ control signal may be pulled low, and the printer cannot be taken on or off-line.

Figure 1:
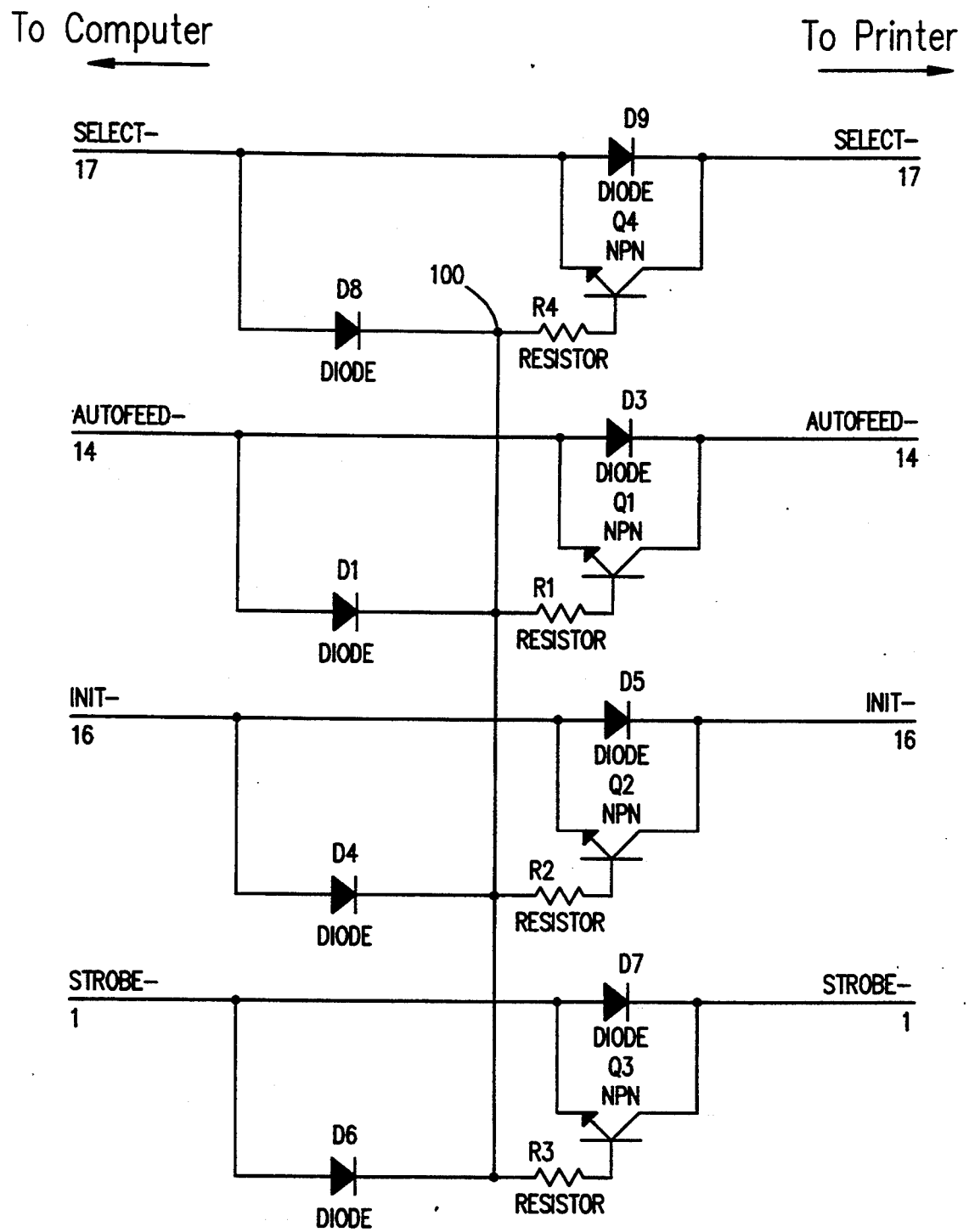
FIG. 1 schematically shows the circuitry of the printer port isolation buffer of the presently preferred embodiment.
Figure 2:
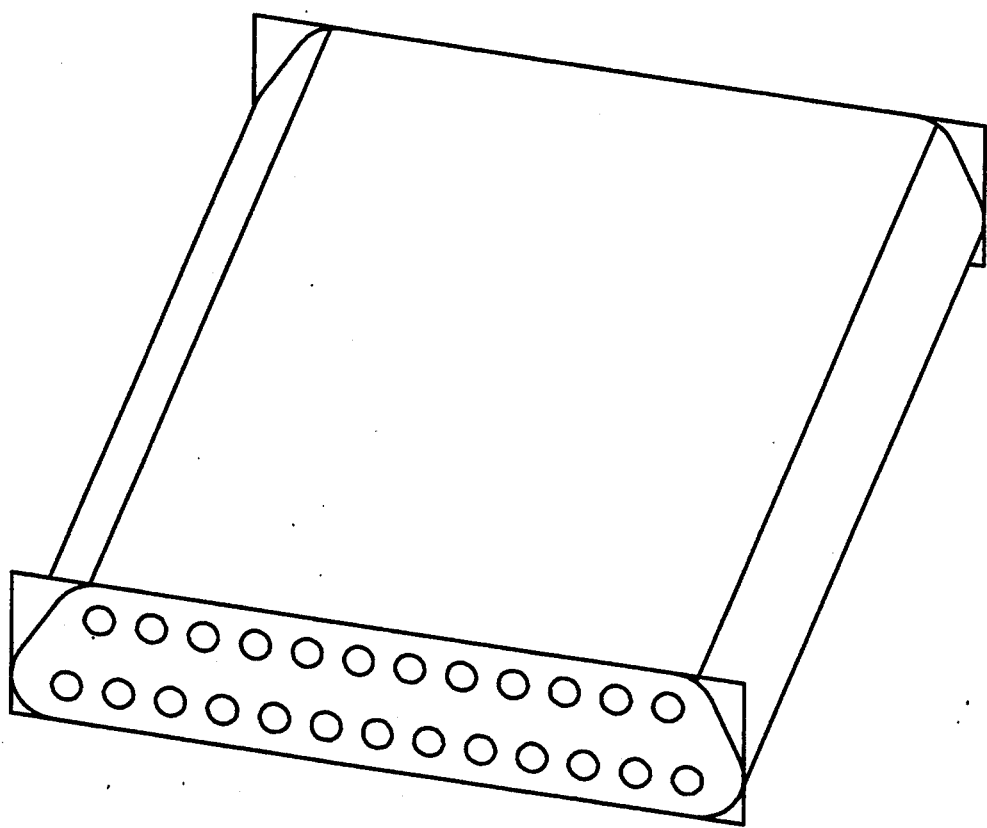
FIG. 2 schematically shows the pin assignments of the standard printer port.
Figure 3:
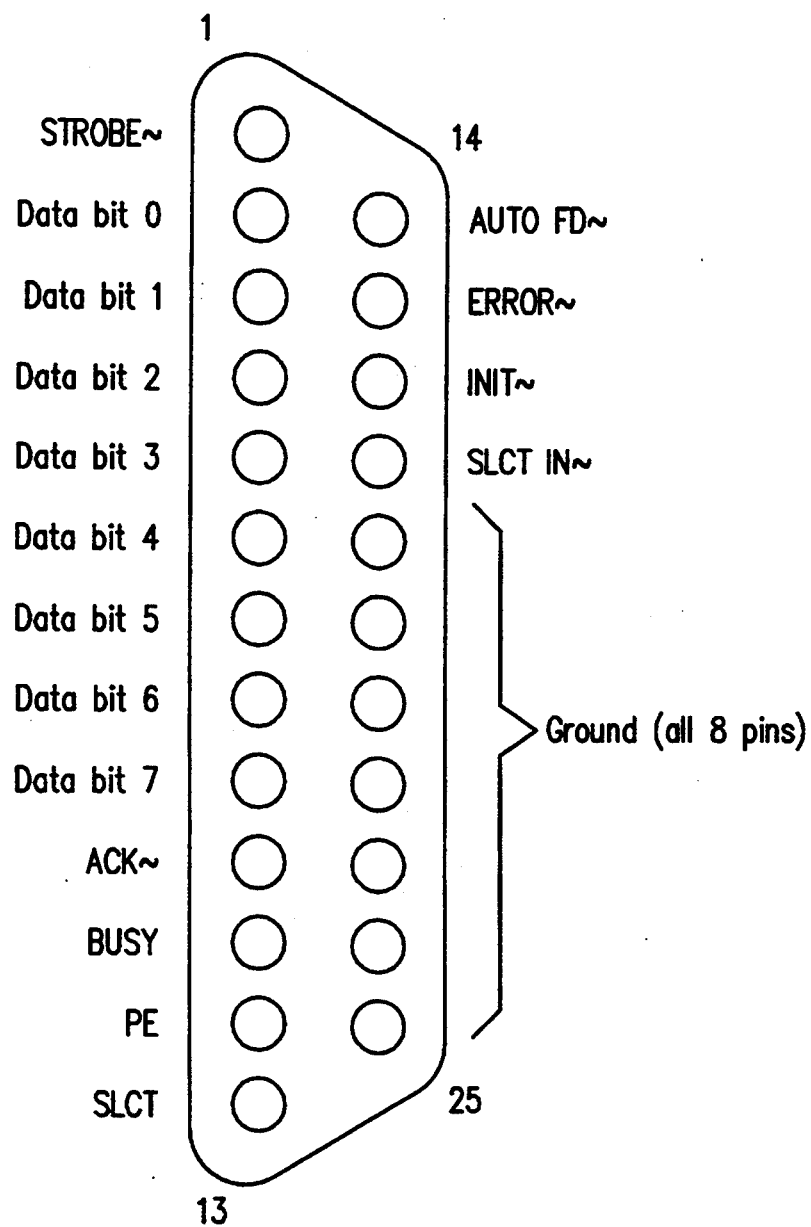
FIG. 3 is a perspective view of a sample embodiment of an innovative printer port adapter which incorporates the circuitry of FIG. 1.

Since most of the problems are the result of the control signals being pulled low when the system is turned off, we need to buffer these signals with a device that presents a high-impedance path when the computer is turned off. A 74LS244 or 74LS245 buffer would provide excellent buffering and isolating characteristics, but these devices require a source of +5 V power. The circuit design shown in FIG. 1 provides a bi-directional path for all of the control signals when the system is turned on. When the system is turned off, all of the control signals present open circuits to the printer.

The isolation buffer does not require any outside power because it is able to draw the low currents used for switching from other control signals. This circuit design assumes that at least one control signal will always be high when the system is turned on. This assumption is quite reasonable since these signals are active LOW, and only one of the four signals should ever be active at once. The state in which all control signals are low is illegal and meaningless to standard printers.

When at least one of the control signals is high, then the base resistors of the transistors will be at a high voltage level. If one control signal is pulled low by the computer, it will bring the emitter of the corresponding transistor low, thereby turning on the transistor. When the transistor is turned on, the collector will be pulled down to approximately the same voltage as the emitter, thus sending a low signal to the printer.

When a control signal is high, the diode between the emitter and collector of the transistor will be forward biased. In this state the diode can supply current to the printer control signal input, thus indicating a high logic state.

When the system is turned off, all of the base resistors will be at a low voltage level, thus preventing the transistor from being turned on. When the transistor is turned off, there is no path for current to flow from the parallel device into the computer. Hence the parallel printer is isolated from the computer system.

As shown in the sample (and preferred) embodiment of FIG. 1, the four buffered lines are STROBE\, SELECT\, AUTOFEED\, and INIT\.

Whenever the computer drives line STROBE\ high, blocking diode D7 pulls up the corresponding line to the printer. This blocking diode is shunted by NPN transistor Q3. Base current for the pass transistor (bipolar Q3) is sourced, through resistor R3, from node 100.

Whenever the computer drives line STROBE\ high, blocking diode D9 pulls up the corresponding line to the printer. This blocking diode is shunted by NPN transistor Q4. Base current for bipolar Q4 is sourced, through resistor R4, from node 100.

Whenever the computer drives line AUTOFEED\ high, blocking diode D3 pulls up the corresponding line to the printer. This blocking diode is shunted by NPN transistor Q1. Base current for bipolar Q1 is sourced, through resistor R1, from node 100.

Whenever the computer drives line INIT\ high, blocking diode D5 pulls up the corresponding line to the primer. This blocking diode is shunted by NPN transistor Q2. Base current for bipolar Q2 is sourced, through resistor R2, from node 100.

Node 100 is pulled up by whichever of the four buffered lines is high: by line STROBE\, if high, through isolation diode D6; by line SELECT\, if high, through isolation diode D8; by line AUTOFEED\, if high, through isolation diode D1; and by line INIT\, if high, through isolation diode D4.

Test Results.

The parallel port isolation buffer has been tested in lab and found definitely to correct the problem described above where the printer cannot be taken on or off line when the Dell System 316SX system board is turned off.

The isolation buffer should not interfere with normal printer operations. In a sample test embodiment (using a Dell System 325D, which uses a VTI 82C106 chip to control the printer port), the disclosed buffer caused a delay of about 165 nsec to the falling (active-going) edge of the control line. However, since each control signal is active for over 20 μsec (usually in the 100+μsec range), the delay of the falling edge should not be noticeable to any parallel device.

The isolation buffer also caused an unnoticeable delay on the rising edge. The rise time of the control signals was observed to be about 6 μsec—far greater than the delay, thus making the delay impossible to measure.

The disclosed isolating buffer also causes a voltage drop of 0.7 V on high going signals to the printer (they are 4.3 V instead of 5 V). However, the threshold should be 2.5 V or below, so this voltage drop will not be a problem. The buffer also increases the value of a low voltage from 0.1 V to 0.36 V, which is still well below the standard threshold of 0.8 V or higher. These measurements indicate that the parallel port isolation buffer will have minimal interference on the normal operation of a parallel printer.

Note that noise margins are reduced somewhat because of the diodes and transistors in the circuit. Under some electrically noisy conditions, this reduction in noise margins might possibly make a difference in performance. However, in normal conditions this sacrifice is believed to be immaterial.

The transistor/diode network provides a high-impedance-off, low-impedance-on switch with a minimum number of parts. This isolation capability—with the bases of the transistors tied to VCC through a resistor—could be useful on a wide variety of products that use CMOS logic parts to interface to "real-world" devices.

Advantages

Advantages of the disclosed innovations include—but are not limited to—the following.

An advantage of the disclosed isolating buffer is that it requires no external power—all of the power required to switch the transistors on is supplied by the control signals, at least one of which will always be high during normal operations.

A further advantage of the disclosed isolating buffer is that it provides a low-cost solution to many parallel port problems.

A particular advantage of the port adapter module is that it is small a convenient. Thus, such modules can easily be included in fieH! service kits or mailed to customers.

A further advantage of the port adapter module is that installation is very simple, so that it can be mailed to unsophisticated customers for the customer to install.

Further Modifications and Variations

It will be recognized by those skilled in the art that the innovative concepts disclosed in the present application can be applied in a wide variety of contexts. Moreover, the preferred implementation can be modified in a tremendous variety of ways. Accordingly, it should be understood that the modifications and variations suggested below and above are merely illustrative. These examples may help to show some of the scope of the inventive concepts, but these examples do not nearly exhaust the full scope of variations in the disclosed novel concepts.

For example, in the presently preferred embodiment, charge is robbed from any one of the four control lines (through a respective isolation diode), to turn on the active devices of any others of the buffered lines. However, in alternative embodiments, it may not be necessary to provide an isolation diode (for charge robbing) on every input line: depending on what signal combinations are possible, it may be possible to omit some isolation diode connections.

For another example, it may also be possible, in some alternative embodiments, to incorporate more than one group of commonly buffered lines (like that shown in FIG. 1) into a single connector.

For another example, it is also possible, in alternative embodiments, to incorporate blocking diodes and/or series or shunt resistors on other lines, in addition to a group of commonly buffered lines like that shown in FIG. 1, in a single connector.

For another example, it is also possible, in alternative embodiments, to use a field-effect transistor in place of the bipolar pass transistors of the presently preferred embodiment. This is considered to be less desirable, since discrete MOS transistors tend to be somewhat less robust and more expensive than discrete bipolars; but this too is a possible alternative embodiment.

For another example, it is theoretically possible to integrate the port control circuitry in a common module or common chip with the CPU. The disclosed teachings are also applicable to embodiments of this type.

In the presently preferred embodiment, the only lines which are buffered are only the lines which communicate control signals from the CPU (or, more precisely, from the port controller chip) to the printer. However, in other embodiments, it is also possible (alternatively and less preferably) to buffer the status lines which carry status signals from the printer to the computer system. In such embodiments, the buffers on these status lines are preferably connected in the opposite sense to that used for the buffers on the control lines.

The isolating buffer circuitry can be incorporated onto a system board to improve the performance of the parallel port. Alternatively, the circuitry can be installed on a small printed circuit board with DB25 connectors on each end for attaching directly to a parallel port.

As implemented, only the CONTROL signals are buffered. The data and status signals could also be buffered, but experience has shown that most problems can be solved with just the CONTROL signal buffering.

As will be recognized by those skilled in the art, the innovative concepts described in the present application can be modified and varied over a tremendous range of applications, and accordingly the scope of patented subject matter is not limited by any of the specific exemplary teachings given.

What is claimed is:

1. A module for electrically isolating connectors when power is removed, comprising:

first and second connectors, said first and second connectors having common pinout;

a plurality of lines each being connected from a respective pin connection of said first connector through a respective blocking diode to a corresponding pin connection of said second connector; wherein, for at least one of said second plurality of lines, said respective blocking diode is oriented to pass current when a pin connection corresponding to said one of said plurality of lines of said first connector is in a first logic state and to block current when said corresponding pin connection of said first connector is in a second logic state opposite to said first logic state, and said respective blocking diode is shunted by a respective pass transistor, and said pass transistor is connected to said plurality of lines to pass current whenever any one of said pin connections of said first connector are in said first logic state and when said corresponding pin connection of said first connector is in said second logic state, wherein said respective pin connections of said first connector are all in said second logic state when power is removed thereby electrically isolating the first and second connectors.

2. The module of claim 1, wherein said pass transistor is a bipolar transistor.

3. The module of claim 1, wherein said pass transistor is a field-effect transistor.

4. The module of claim 1, wherein said pass transistor is an N-channel insulated-gate field-effect transistor.

5. The module of claim 1, wherein said pass transistor is an NPN bipolar transistor.

6. The module of claim 1, wherein said blocking diode is a junction diode.

7. A module for isolating a communication port of a computer from a communication port of a printer when the computer is turned off, the module comprising:

first and second connectors, said first and second connectors having common pinout;

a plurality of lines, each being connected from a respective pin connection of said first connector through a respective blocking diode to a corresponding pin connection of said second connector, and each connected through a respective isolation diode to a common charge-robbing node;

wherein, for selected ones of said plurality of lines, said respective blocking diode is connected to provide current from said pin connection of said first connector to said corresponding pin connection of said second connector when said pin connection of said first connector is in a first logic state and to block current when said pin connection of said first connector is in a second logic state, and a respective pass transistor is connected in parallel with said respective blocking diode, and said respective pass transistor is operatively connected to be controlled by said common charge-robbing node to pass current when said pin connection of said first connector is in said second logic state, wherein said pin connections of said first connector are all in said second logic state when the computer is turned off, thereby electrically isolating said first and second connectors.

8. The module of claim 7, wherein said pass transistor is a bipolar transistor.

9. The module of claim 7, wherein said pass transistor is a field-effect transistor.

10. The module of claim 7, wherein said pass transistor is an N-channel insulated-gate field-effect transistor.

11. The module of claim 7, wherein said pass transistor is an NPN bipolar transistor.

12. The module of claim 7, wherein said blocking diode is a junction diode.

13. An interface for transferring a plurality of signals from a computer while the computer is on, and for isolating the signals when the computer is off, the interface comprising:

a connector having a first terminal and a second terminal;

a first rectifier receiving a first signal and coupled to said first terminal of said connector, wherein said first rectifier transfers said first signal to said first terminal when said first signal is in a first state and blocks said first signal from said first terminal when said first signal is in a second state;

a second rectifier receiving a second signal and coupled to said second terminal of said connector, wherein said second rectifier transfers said second signal to said second terminal when said second signal is in said first state and blocks said second signal from said second terminal when said second signal is in said second state; and a first switch circuit coupled to said first rectifier and receiving said first and second signals for transferring said first signal to said first terminal when said first signal is in said second state and said second signal is in said first state, wherein said first and second signals are in said second state when the computer is turned off thereby electrically isolating said connector from said first signal.

14. The interface circuit of claim 13, further comprising:

a second switch circuit coupled to said second rectifier and receiving said first and second signals for transferring said second signal to said second terminal when said second signal is in said second state and said first signal is in said first state.

15. The interface circuit of claim 13, wherein said first rectifier comprises a diode having an anode receiving said first signal and a cathode coupled to said first terminal of said connector; and said second rectifier comprises a diode having an anode receiving said second signal and a cathode coupled to said second terminal of said connector.

16. The interface circuit of claim 13, wherein said first switch circuit includes:

means having a plurality of inputs for receiving said first and second signals and an output for asserting a control signal if either of said first and second signals is in said first state; and a transistor having a current path shunting said first rectifier and a control terminal coupled to said receiving means output, wherein said transistor is activated to bypass said first rectifier if said control signal is asserted.

17. The interface circuit of claim 16, wherein said first switch circuit receiving means includes:

a third rectifier receiving said first signal; and a fourth rectifier coupled to said first rectifier and receiving said second signal;

wherein said third and fourth rectifiers have a common node for asserting said control signal when either of said first and second signals are in said first state.

18. The interface circuit of claim 17, wherein said third rectifier comprises a diode having an anode receiving said first signal and a cathode; and said fourth rectifier comprises a diode having an anode receiving said second signal and a cathode coupled to said cathode of said first rectifier.

* * * * *